Jan. 26, 1926.
1,570,851
T. C. METCALFE
TIRE ARMOR
Filed April 1, 1925
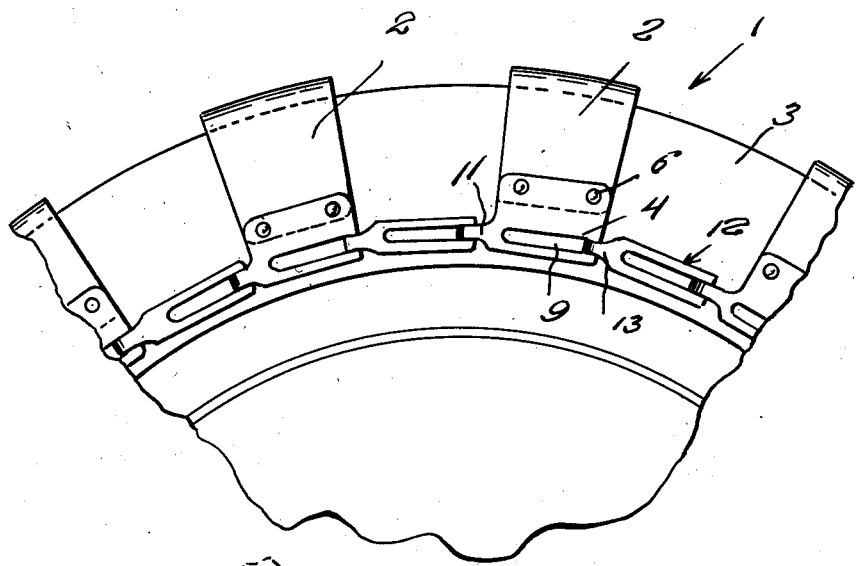
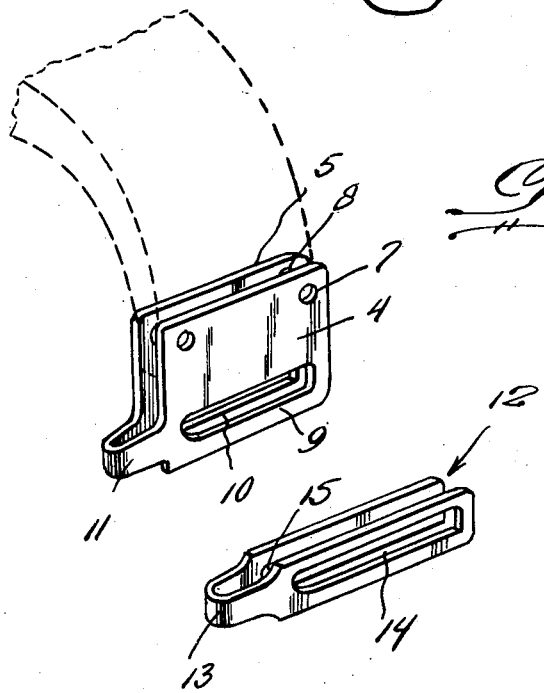
T. C. Metcalfe.
Inventor Patented Jan. 26, 1926.

1,570,851

UNITED STATES PATENT OFFICE.

THOMAS CARMAN METCALFE, OF BOWSMAN RIVER, MANITOBA, CANADA.

TIRE ARMOR.

Application filed April 1, 1925. Serial No. 20,006.

*To all whom it may concern:*

Be it known that I, THOMAS CARMAN METCALFE, a citizen of the Dominion of Canada, residing at Bowsman River, in the Province of Manitoba and Dominion of Canada, have invented certain new and useful Improvements in a Tire Armor, of which the following is a specification.

This invention relates to improvements in tire armors and has for its principal object to provide an armor which includes a series of segmental sections cut from an old tire casing, means being provided for uniting and supporting the segmental sections on the tread portion of a tire whereby the latter will be protected against coming in contact with the surface, thus preventing any possibility of a puncture, furthermore protecting the tire against skidding.

Another important object of the invention is to provide a tire armor of the above mentioned character, wherein the segmental sections comprising the armor will sustain all of the wear to which the tread of a tire is ordinarily subjected.

A still further object is to provide a tire armor of the above mentioned character, which is simple in construction, inexpensive, strong and durable and further well adapted for the purposes for which it is designated.

Other objects and advantages of this invention will become apparent during the course of the following description.

In the accompanying drawing forming a part of this specification and in which like numerals designate like parts throughout the same:

Figure 1 is a fragmentary side elevation of a vehicle wheel showing the tire armor embodying my invention in position over the tread of the tire.

Figure 2 is a detail perspective view of the plate sections secured to each end of each of the sections, and Figure 3 is a detail perspective view of the connecting links for the sections.

In the drawing wherein for the purpose of illustration is shown the preferred embodiment of my invention, the numeral 1 designates generally my improved tire armor, the same comprising a series of segmental sections 2 which are cut from an old tire casing, the same being adapted to straddle or embrace the periphery of the tire 3. The segmental sections are arranged in annular spaced relation with respect to each other as clearly illustrated in Figure 1.

A pair of complementary plate sections 4 and 5 are secured at their upper portions on the outer and inner sides respectively of each end of each section by any suitable fastening means shown at 6, the plates being provided with registering openings 7 and 8 respectively in their upper portions for receiving said fastening means. Each pair of complementary plates have their lower portions extending beyond the end of each segmental section and the lower portions of the plates are provided with longitudinally extending registering slots 9 and 10 respectively. The purpose of these slots will be presently described.

The loop portion 11 affords a connection between the complementary plates 4 and 5 of each pair at the lower portions thereof as clearly illustrated in Figure 2. The looped portion 11 extends in the same plane as the complementary plates.

A link such as is shown generally at 12 provides the connection between the adjacent segmental sections of the tire armor, and the link is of substantially U-shaped formation and being formed of flat material. The crown portion 13 of the substantially U-shaped link 12 is reduced and is adapted to be received in the registering slots 9 and 10 provided in the complementary plate of each pair, the looped portion 13 of each link being disposed in the ends of the registering slots 9 and 10 furthest from the looped portion 11, the looped portion 11 being adapted to be disposed in the elongated slots 14 and 15 respectively formed in the arms of the U-shaped link. The looped portion 11 will be disposed in the ends of the slots 14 and 15 adjacent the outer free ends of the arms as also clearly illustrated in Figure 1. The provision of the links provides a means for uniting and supporting the segmental sections of the tire casing 1 circumferentially around the tire 3.

A tire armor of the above mentioned character, wherein an old tire casing is cut up into segmental sections and utilized as a protector will sustain all the wear ordinarily subjected by the tire on the vehicle wheel and will furthermore prevent or reduce the possibility of the tire being punctured.

While I have shown the preferred embodiment of my invention, it is to be understood that various changes in the size, shape and arrangement of parts may be resorted to without departing from the spirit of the invention and the scope of the appended claim.

Having thus described the invention, what I claim as new is:—

A tire armor comprising a series of segmental sections cut from an old tire casing, said sections adapted to straddle a tire and arranged in annular spaced relation, a pair of complementary plate sections secured at their upper portions on the inner and outer sides respectively at each end of each section, the lower portion of said plate sections extending below the lower edges of the ends of each section, the lower portions of the plates being provided with registering longitudinally extending slots, a looped portion connecting the lower portions of the plate at one side of each section, and links connecting the looped portions of the plate with the slotted adjacent portions of the plate carried by the adjacent segmental sections, said links being of substantially U-shaped formation, the arms thereof being slotted and adapted to engage the looped portions of the plate, the crown portion of each of the substantially U-shaped links engaging the slotted lower portions of the plates.

In testimony whereof I affix my signature.

THOMAS CARMAN METCALFE.